United States Patent

Mollee

[11] Patent Number: 6,093,266
[45] Date of Patent: Jul. 25, 2000

[54] WHEEL BODY

[76] Inventor: Arend Anne Mollee, Nieuwstraat 5, NL 4845 CH Wagenberg, Netherlands

[21] Appl. No.: 09/050,729

[22] Filed: Mar. 30, 1998

[51] Int. Cl.$^7$ .......................... C22C 21/16; C22C 21/06; B60B 17/00; B60B 3/02; B22D 21/00
[52] U.S. Cl. ...................... 148/439; 148/549; 148/552; 295/31.1; 295/32
[58] Field of Search ................................ 148/549, 552, 148/439; 420/530; 295/31.1, 32

[56] References Cited

FOREIGN PATENT DOCUMENTS

| | | |
|---|---|---|
| 507411 | 10/1992 | European Pat. Off. . |
| 599696 | 6/1994 | European Pat. Off. . |
| 62-023973 | 1/1987 | Japan . |
| 63-103702 | 5/1988 | Japan . |
| 63-111197 | 5/1988 | Japan . |
| 2011401 | 1/1990 | Japan . |
| 4-276049 | 10/1992 | Japan . |

OTHER PUBLICATIONS

"Binary Alloy Phase Diagrams AC–AU To FE–RH" T.B. Massalski published 1986, *American Society for Metals*, pp. 129–131.

"Aluminium vol. 1, Properties, Physical Metallurgy and Phase Diagrams" by K.R. Van Horn, publ. 1967, *American Society for Metals* pp. 313–317.

"Properties and Selection" Nonferrous Alloys and Pure Metals *American Society for Metals, Metals Handbook, vol. 2, 1979,* pp. 106–107.

*Primary Examiner*—Sikyin Ip
*Attorney, Agent, or Firm*—Bachman & LaPointe, P.C.

[57] ABSTRACT

A wheel body for carriages or other vehicles which are used, inter alia, in roller-coasters and other installations of amusement parks, the wheel body being made of a casting alloy which, expressed in percentages by weight, comprises the following elements:

Al>94.000 Mg>4.500 Si<0.100 Cu<0.015 Fe<0.100 Mn<0.007 Ti<0.025 Zn<0.050 Sn<0.010.

A method for fabricating the wheel body includes fitting the wheel body with a running tread of plastic such as polyurethane.

7 Claims, 1 Drawing Sheet

WHEEL BODY

BACKGROUND OF THE INVENTION

The present invention relates to a wheel body for carriages or other vehicles which are used, inter alia, in roller-coasters and other installations of amusement parks.

According to the prior art, wheels or wheel bodies for carriages or other vehicles used, inter alia, in roller-coasters and other installations of amusement parks, are fabricated from an aluminum alloy. Because of the good castability of the latter, Al-Si alloys are often used for this application. Carriages or other vehicles used in the roller-coasters and other installations of amusement parks comprises not only wheels for forward movement of the vehicle on the installation, but also wheels by which the vehicle in the installation bears against a guide.

These guide wheels do not make continuous contact with the guide, instead the contact between the guide wheel and the guide is subject to interruptions. When the contact between a guide wheel and the guide is broken, the speed of rotation of the wheel will decrease. When the contact between the guide wheel and the guide is subsequently restored, the guide wheel will be subject to large acceleration. In order to be able to sustain the acceleration and the changing stresses which occur when the contact between the guide wheel and the guide is broken and restored, a guide wheel is ideally made from a ductile material. In order, moreover, to be able to absorb more effectively the shock which occurs when the wheel makes contact with the guide, the running tread of the wheels is preferably provided with a running tread of plastic. A second effect of such a plastic running tread being fitted is that noise is reduced. In the prior art it is customary to provide the wheels used in roller-coasters and comparable installations with a running tread of polyurethane rubber, fixed in an exothermal reaction in a vulcanization process. In that exothermal reaction the temperature may increase to up to 160° C.

A first important drawback of the wheels which are used in roller-coasters and comparable installations according to the prior art is that the Al-Si alloys used have relatively low elongation at rupture, less than 10%. Because of the enormous mechanical stresses to which the wheels are subjected, there is a risk that the wheels may break spontaneously without much deformation during overloading or after having been damaged. Certainly, given that the roller-coasters and comparable installations are most commonly used in an environment where many people are present, this means that life-endangering situations can thus be created.

A second important drawback of the wheels which are used in roller-coasters and comparable installations according to the prior art is that the mechanical characteristics of the Al-Si alloys used are adversely affected under the influence of thermal stress in the region of 160° C. This means that each time a running tread of polyurethane is applied to the wheel by means of an exothermal reaction in the vulcanization process, the mechanical characteristics of the wheel will change. In the prior art the maximum number of times a wheel is allowed to be provided with a new running tread of polyurethane rubber is therefore restricted to a limited number of times, for example five times.

SUMMARY OF THE INVENTION

The object of the invention is to provide a wheel body for carriages or other vehicles which are used, inter alia, in roller-coasters and other installations of amusement parks, which do not have the drawbacks of the prior art. This object is achieved in the present invention by the wheel body according to the present invention being made of a casting alloy which, expressed in percentages by weight, comprises the following elements:

Al>94.000 Mg>4.500 Si<0.100 Cu<0.015 Fe<0.100 Mn<0.007 Ti<0.025 Zn<0.050 Sn<0.010.

BRIEF DESCRIPTION OF THE DRAWINGS

An advantageous embodiment of the wheel body according to the present invention is illustrated in the accompanying figures.

DETAILED DESCRIPTION

Figure 1:
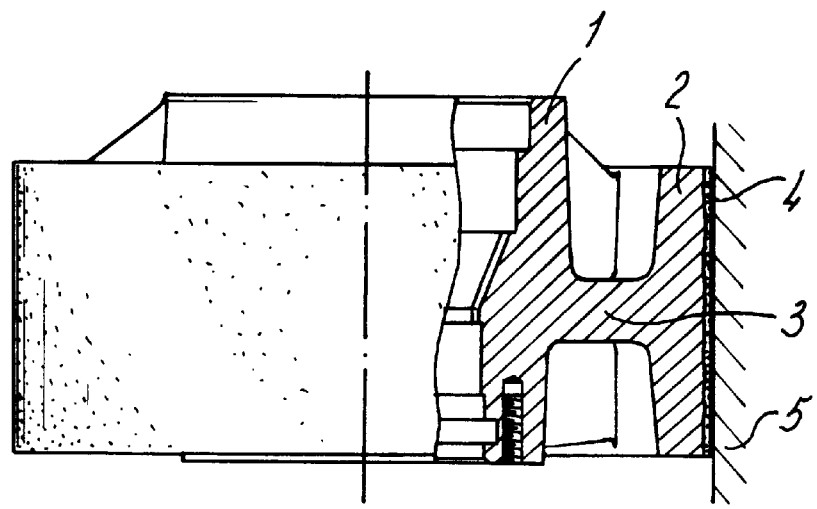
FIG. 1 schematically shows a cross-section of the wheel according to the present invention.
Figure 2:
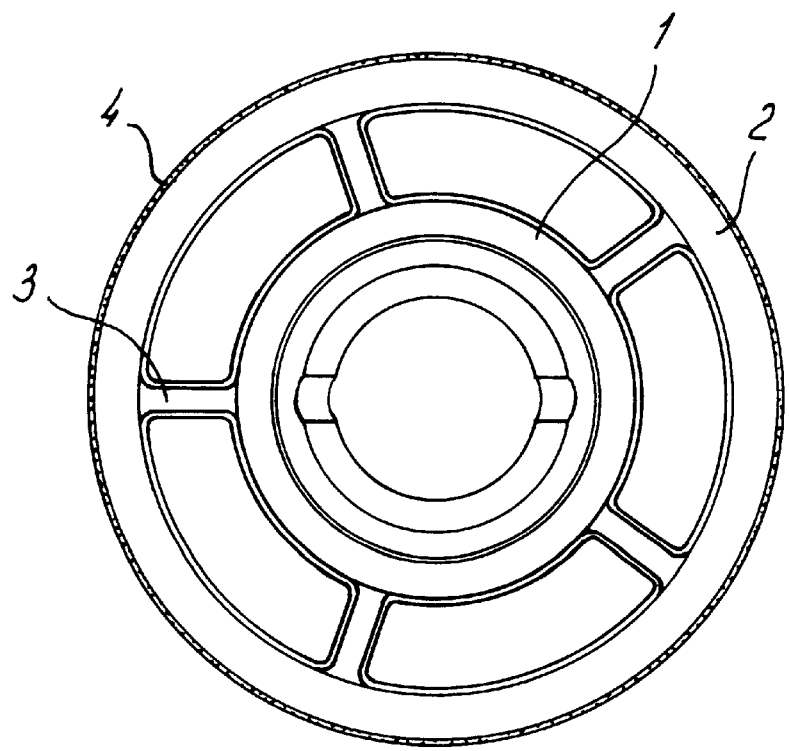
FIG. 2 schematically shows a plan view from above of the wheel from the present invention.

FIGS. 1 and 2 show a wheel comprising a wheel body which comprises a hub 1, a rim 2 and a number of stiffening ribs 3. Fixed to the wheel body is a plastic running tread 4 by which the wheel makes contact with a guide 5.

In accordance with the invention, the wheel body is formed of a casting alloy which, expressed in percentages by weight, comprises the following elements:

Al>94.000 Mg>4.500 Si<0.100 Cu<0.015 Fe<0.100 Mn<0.007 Ti<0.025 Zn<0.050 Sn<0.010.

In this context it is advantageous for the wheel body according to the present invention to be made of a casting alloy which, expressed in percentages by weight, comprises the following elements:

94.0<Al<95.0 4.5<Mg<5.0 0.005<Si<0.05 0.001<Cu<0.01 0.001<Fe<0.01 0.001<Mn<0.01 0.001<Ti<0.01 0.001<Zn<0.01 10.001<Sn<0.01.

The advantage of using the above mentioned Al-Mg casting alloy is that this alloy has an elongation at rupture which is greater than 14% and a fatigue limit at a load above 60 N/mm$^2$. "FEM" studies have shown that the highest stress achieved in said wheel design for a roller-coaster is at most about 31 N/mm$^2$. This is far below the fatigue limit load of 60 N/mm$^2$. This means that an assessment of the service life of the wheels for use in roller-coasters and the like is not applicable and that the wheels, in principle, have an unlimited service life. If the length of a ride is 660 to 1600 meters and if the usage is 25 rides per hour for eight hours per day, wheels in a roller-coaster are subject to at least 0.3 to 0.7 million load changes. Wheels used for that purpose, which comprise alloys according to the prior art, will be subject to fatigue damage after at most 10 to 100 days of service. Wheels used for that purpose according to the present invention are not subject to fatigue damage. Another effect of the presence of a large elongation at rupture is, that the wheel body is able to deform without breaking. This means that deformation of the wheel body can manifest itself without the wheel breaking immediately and hazardous situations being produced.

It is advantageous for the wheel body according to the present invention to be fitted with a running tread of plastic such as polyurethane.

Surprisingly, the mechanical characteristics of the Al-Mg alloy which is used for the wheel body according to the present invention proved not to change after repeated thermal stress in a temperature range of from 0 to 180° C. This means that applying a running tread of plastic, for example of polyurethane, in an exothermal reaction in which the temperature increases up to, for example, 160° C., does not affect the mechanical characteristics of the alloy which is used for the wheel bodies according to the present invention. This means that the application of a new running tread of polyurethane can, in principle, be repeated an infinite number of times without adversely affecting the mechanical characteristics.

The present invention further relates to a method for fabricating a wheel body wherein, in a first step, a wheel body is fabricated by means of a casting process from a casting alloy which comprises the following elements, indicated in percentages by weight:

Al>94.000 Mg>4.500 Si<0.100 Cu<0.015 Fe<0.100 Mn<0.007 Ti<0.025 Zn<0.050 Sn<0.010, said wheel body, in a second step, being fitted with a running tread of plastic such as polyurethane.

In this context it is advantageous for the casting alloy to comprises the following elements, indicated in percentages by weight:

94.0<Al<95.0 4.5<Mg<5.0 0.005<Si<0.05 0.001<Cu<0.01 0.001<Fe<0.01 0.001<Mn<0.01 0.001<Ti<0.01 0.001<Zn<0.01 0.001<Sn<0.01.

It is further advantageous for the wheel body according to the present invention to be fabricated in a sand casting process.

In the prior art, wheel bodies for carriages used in roller-coasters and comparable installations of amusement parks are, as said before, usually made of an Al-Si alloy. Such wheels or wheel bodies are generally fabricated by means of a gravity die-casting process. The alloy which is used for the wheel bodies or wheels according to the present invention can advantageously be fabricated by means of a casting process in sand. After the fabrication of the wheel bodies themselves it is possible, by means of an exothermal reaction in a vulcanization process, for a running tread of plastic such as polyurethane rubber to be applied to the wheel bodies, the temperature increasing in the process to at most 160° C. As already stated above, this does not affect the mechanical characteristics of the Al-Mg alloy used.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A wheel body made of an aluminum alloy which, expressed in percentages by weight, comprises:

94.0<Al<95.0
4.5<Mg<5.0
0.005<Si<0.100
0.001<Cu<0.015
0.001<Fe<0.100
0.001<Mn<0.007
0.001<Ti<0.025
0.001<Zn<0.050
0.001<Sn<0.01.

2. A wheel body according to claim 1 wherein said wheel body is fitted with a running tread of plastic.

3. A wheel body according to claim 2 wherein said plastic is polyurethane.

4. A method for fabricating a wheel comprising casting a wheel body from an aluminum alloy which, expressed in percentages by weight, comprises:

94.0<Al<95.0
4.5<Mg<5.0
0.005<Si<0.100
0.001<Cu<0.015
0.001<Fe<0.100
0.001<Mn<0.007
0.001<Ti<0.025
0.001<Zn<0.050
0.001<Sn<0.01, and fitting the cast wheel body, with a running tread of plastic.

5. A method according to claim 4 wherein said casting step comprises sand casting.

6. A method according to claim 4 wherein said plastic is polyurethane.

7. A method according to claim 6 including the step of applying the running tread to the wheel body by means of an exothermal reaction at a temperature of at most 160° C.

* * * * *